United States Patent
Yokoyama

(10) Patent No.: US 12,405,664 B2
(45) Date of Patent: Sep. 2, 2025

(54) INFORMATION PROCESSING DEVICE, INFORMATION PROCESSING SYSTEM, INFORMATION PROCESSING METHOD, AND NON-TRANSITORY COMPUTER READABLE MEDIUM

(71) Applicant: CANON KABUSHIKI KAISHA, Tokyo (JP)

(72) Inventor: Masanao Yokoyama, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/307,913

(22) Filed: Apr. 27, 2023

(65) Prior Publication Data
US 2024/0077944 A1  Mar. 7, 2024

(30) Foreign Application Priority Data
May 16, 2022 (JP) .................... 2022-080180

(51) Int. Cl.
| | |
|---|---|
| *G06F 3/01* | (2006.01) |
| *G06F 3/0346* | (2013.01) |
| *G06T 7/70* | (2017.01) |
| *G06V 40/10* | (2022.01) |

(52) U.S. Cl.
CPC ........... *G06F 3/014* (2013.01); *G06F 3/0346* (2013.01); *G06T 7/70* (2017.01); *G06V 40/11* (2022.01); *G06F 2203/0331* (2013.01); *G06T 2207/30196* (2013.01)

(58) Field of Classification Search
CPC ........ G06F 3/014; G06F 3/0346; G06F 3/011; G06F 3/017; G06F 2203/0331; G06T 7/70; G06T 2207/30196; G06V 40/11
See application file for complete search history.

(56) References Cited

U.S. PATENT DOCUMENTS

| | | | |
|---|---|---|---|
| 9,047,698 B2 | 6/2015 | Maciocci | |
| 10,537,795 B2 | 1/2020 | Bristol | |
| 10,585,497 B2 * | 3/2020 | Park | G06F 3/016 |
| 11,340,736 B2 * | 5/2022 | Tomizawa | G06F 3/0425 |
| 11,507,203 B1 * | 11/2022 | Bosworth | G06F 3/0304 |
| 2010/0156787 A1 * | 6/2010 | Katayama | G02B 27/017 |
| | | | 345/157 |

(Continued)

FOREIGN PATENT DOCUMENTS

| | | |
|---|---|---|
| JP | 2014-514652 A | 6/2014 |
| JP | 2020-519992 A | 7/2020 |

(Continued)

*Primary Examiner* — David Tung
(74) *Attorney, Agent, or Firm* — Carter, DeLuca & Farrell LLP

(57) ABSTRACT

An information processing device estimates an attitude of a hand of a user holding a controller with the hand. The information processing device has an acquisition unit, a determination unit, and an estimation unit. The acquisition unit acquires inertial information from an inertial sensor provided in the controller. The determination unit determines whether a specific portion of the hand of the user is detected in a captured image acquired by imaging of an imaging unit. The estimation unit estimates the attitude of the hand of the user on a basis of the captured image and the inertial information in a case where the specific portion is detected in the captured image.

8 Claims, 14 Drawing Sheets

(56) References Cited

U.S. PATENT DOCUMENTS

| | | | | |
|---|---|---|---|---|
| 2018/0285636 A1* | 10/2018 | Fei | .................. | G02B 27/017 |
| 2019/0250708 A1* | 8/2019 | Gupta | .................. | G02B 27/017 |
| 2020/0133395 A1* | 4/2020 | Kaneko | .................. | G06F 3/0346 |
| 2021/0042513 A1* | 2/2021 | Kato | .................. | G06F 3/011 |
| 2022/0308658 A1* | 9/2022 | Hashimoto | ............. | G06F 3/014 |

FOREIGN PATENT DOCUMENTS

| | | |
|---|---|---|
| WO | 2021/157691 A1 | 8/2021 |
| WO | 2021/166717 A1 | 8/2021 |

\* cited by examiner

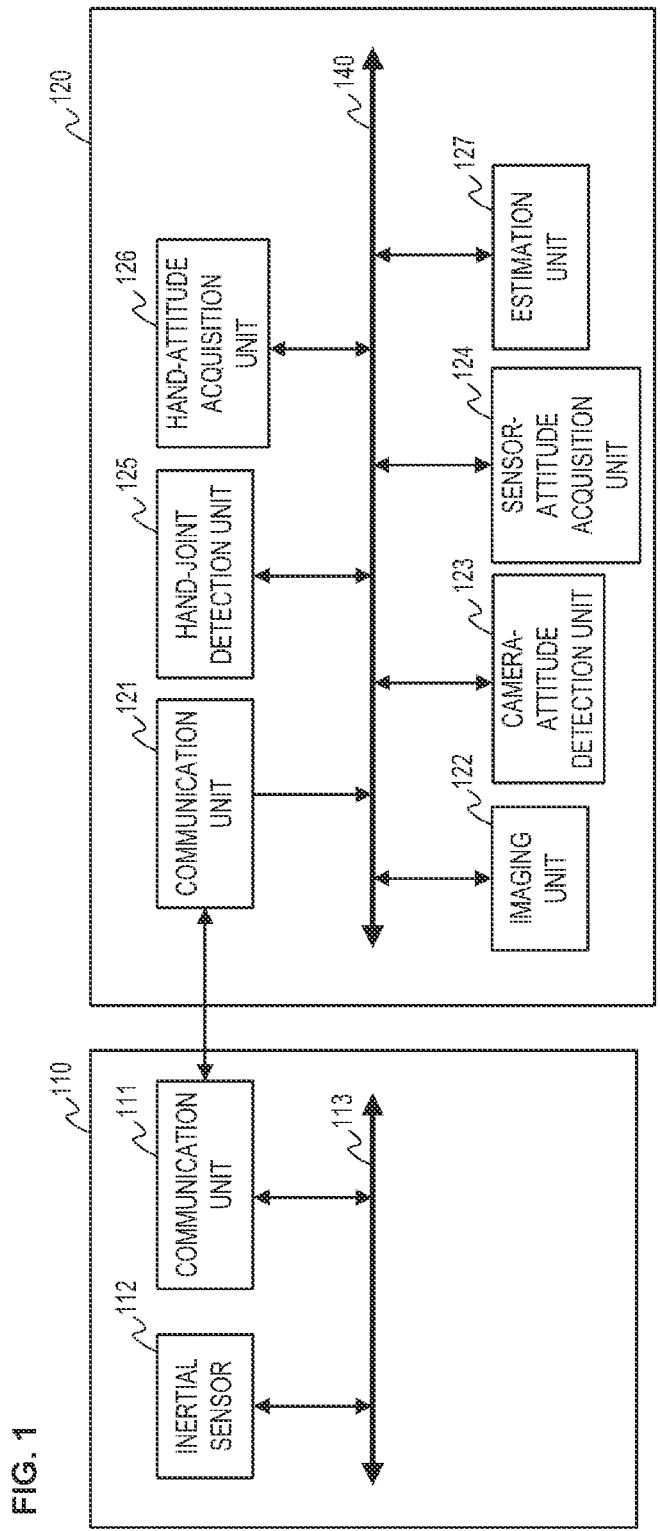

INFORMATION PROCESSING DEVICE, INFORMATION PROCESSING SYSTEM, INFORMATION PROCESSING METHOD, AND NON-TRANSITORY COMPUTER READABLE MEDIUM

BACKGROUND OF THE INVENTION

Field of the Invention

The present invention relates to an information processing device, an information processing system, an information processing method, and a non-transitory computer readable medium.

Description of the Related Art

Conventionally, in cross reality (XR) systems for making users physically feel virtual reality, a hand controller is used to convert the movement of a hand into an operation in a virtual space at the time of controlling the display of a head-mounted display (HMD). The HMD is a glasses-type device including a small display attached to the head of a user.

Japanese Patent Application Laid-open No. 2020-519992 proposes a hand controller that causes a plurality of infrared light (IR light) to be emitted from a hand controller so that a camera mounted in an HMD is enabled to receive the infrared light and detect the position and attitude of a hand. Further, Japanese Patent Application Laid-open No. 2014-514652 proposes a device that compares the body portion of a user reflected in a captured image of a camera installed in an HMD with a bone model stored in a memory to reflect the position and attitude of the user in a virtual space.

However, the technology disclosed in Japanese Patent Application Laid-open No. 2020-519992 requires the mounting of a plurality of light-emitting diodes in the hand controller to detect the position and attitude of the hand controller, and therefore the miniaturization of the hand controller becomes difficult. Further, the technology disclosed in Japanese Patent Application Laid-open No. 2014-514652 has a problem that detection accuracy reduces depending on the direction of the hand of a user.

SUMMARY OF THE INVENTION

In view of the above problems, the present invention has an object of providing a technology that makes it possible to accurately acquire (estimate) the attitude of the hand of a user on the basis of information on a controller even when the controller held by the hand of the user is small.

An aspect of the present invention is an information processing device that estimates an attitude of a hand of a user holding a controller with the hand including at least one memory and at least one processor that function as: an acquisition unit configured to acquire inertial information from an inertial sensor provided in the controller; a determination unit configured to determine whether a specific portion of the hand of the user is detected in a captured image acquired by imaging of an imaging unit; and an estimation unit configured to estimate the attitude of the hand of the user on a basis of the captured image and the inertial information in a case where the specific portion is detected in the captured image.

An aspect of the present invention is an information processing method for estimating an attitude of a hand of a user holding a controller with the hand, the method comprising: acquiring inertial information from an inertial sensor provided in the controller; determining whether a specific portion of the hand of the user is detected in a captured image acquired by imaging of an imaging unit; and estimating the attitude of the hand of the user on a basis of the captured image and the inertial information in a case where the specific portion is detected in the captured image.

Further features of the present invention will become apparent from the following description of exemplary embodiments with reference to the attached drawings.

BRIEF DESCRIPTION OF THE DRAWINGS

FIG. 1 is a configuration diagram of a controller system according to a first embodiment;

DESCRIPTION OF THE EMBODIMENTS

Hereinafter, preferred embodiments of the present invention will be described in detail on the basis of the accompanying drawings.

First Embodiment

FIG. 1 is a configuration diagram showing a configuration example of a controller system (information processing system) according to a first embodiment. The controller system has a controller 110 and an HMD 120.

Figure 2A:
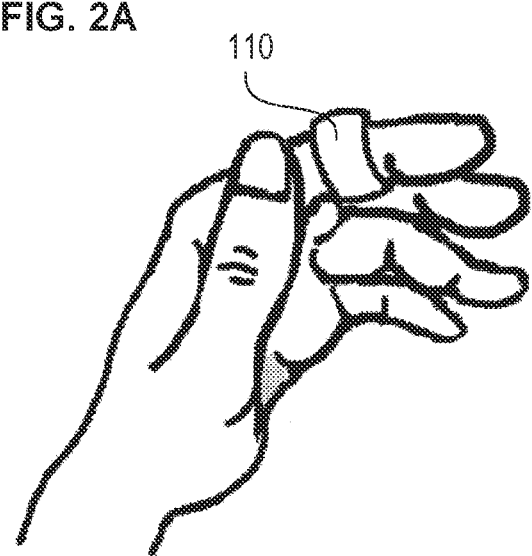
FIGS. 2A and 2B are diagrams for describing a controller according to the first embodiment.

The controller 110 is a hand controller (control device) for controlling the display of the HMD 120. The controller 110 is held by a finger of a user. For example, the controller 110 is a hand controller that has a ring shape as shown in FIG. 2A and is attachable to a finger of a user. The shape of the controller 110 will be described as a ring shape in the first embodiment but may be a grove shape or the like. The controller 110 has a communication unit 111, an inertial sensor 112, and a bus 113. Further, the communication unit 111 and the inertial sensor 112 are connected to each other via the bus 113. Note that a plurality of light-emitting diodes (such as large sensors) as shown in Japanese Patent Application Laid-open No. 2020-519992 are not required to be mounted in the controller 110. Therefore, the miniaturization of the controller 110 is made possible.

The communication unit 111 transmits inertial information (information on an angular speed and acceleration) acquired by the inertial sensor 112 to the HMD 120 via wireless communication.

The inertial sensor 112 is an IMU (Inertial Measurement Unit). The inertial sensor 112 acquires information such as an angular speed and acceleration as inertial information. The inertial sensor 112 includes an angular-speed sensor and an acceleration sensor. In the present embodiment, the inertial sensor 112 may also include a geomagnetic sensor or a plurality of angular-speed sensors.

Figure 2B:
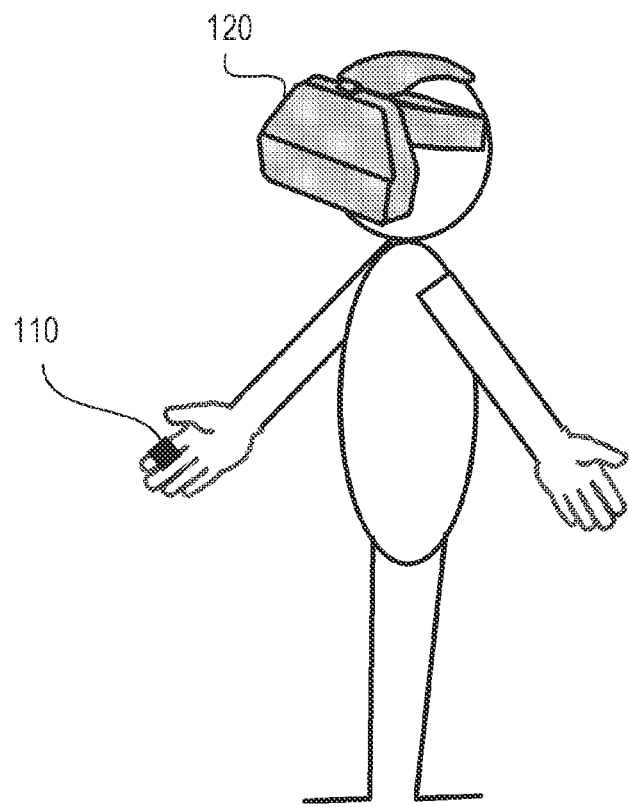

As shown in FIG. 2B, the HMD 120 is a glasses-type information processing device that is attached to the head of a user. The HMD 120 includes a small display (display unit). The HMD 120 has a communication unit 121, an imaging unit 122, a camera-attitude detection unit 123, a sensor-attitude acquisition unit 124, a hand-joint detection unit 125, a hand-attitude acquisition unit 126, an estimation unit 127, and a bus 140. Configurations other than the bus 140 in the HMD 120 are connected to each other via the bus 140. Note that the HMD 120 may have only the communication unit 121 and the imaging unit 122 and an information processing device (control device) such as a computer for controlling the HMD 120 may have the remaining configurations (the hand-attitude acquisition unit 126 and the estimation unit 127).

The communication unit 121 acquires inertial information from the controller 110 via wireless communication.

The imaging unit 122 captures an image of a space in front of the HMD 120. The imaging unit 122 is, for example, a stereo camera. The imaging unit 122 may also be an infrared distance camera.

The camera-attitude detection unit 123 detects the position and attitude of the imaging unit 122 (HMD 120). The position and attitude detected by the camera-attitude detection unit 123 are the position and attitude of the imaging unit 122 in a world coordinate system expressing a reality space. As a method for detecting the position and attitude, a known technology is available. Here, calculation using Visual SLAM (Simultaneous Localization and Mapping) or the like is, for example, available as the known technology. The Visual SLAM is a technology by which the self-position estimation of the imaging unit 122 and the generation of environment-map coordinates are simultaneously enabled in an unknown environment.

The sensor-attitude acquisition unit 124 acquires inertial information acquired by the inertial sensor 112 via the communication unit 121. Then, the sensor-attitude acquisition unit 124 calculates the attitude angle (hereinafter called the "controller attitude-angle") of the controller 110 on the basis of an angular speed and acceleration shown by the inertial information. As a method for calculating the attitude angle of the controller 110, a known technology such as using an extended Kalman filter is available.

Here, the attitude angle represents an index showing the attitude of an object depending on to what extent the object is inclined in a front-rear direction, a top-bottom direction, and a right-left direction with respect to a "reference state." The "attitude angle" represents, for example, a combination of a yaw angle, a pitch angle, and a roll angle. For example, the roll angle represents a rotation angle in a direction along the circumference of the controller 110. Further, the "reference state" represents the states of the controller 110 and the hand of a user obtained when an image of the hand to which the controller 110 is attached is captured in advance by the imaging unit 122. Therefore, the actual attitude angle of the controller 110 and the actual attitude angles of respective fingers are substantially matched even when the attitude of the hand of the user changes, provided that the shape of the hand of the user is substantially fixed with the controller 110 attached to a finger of the user.

The hand-joint detection unit 125 detects the positions of the hand-joint points (the joint points of the fingers of the hand) of the user from an image (captured image) obtained when the imaging unit 122 photographs the hand of the user. Here, the positions of the hand-joint points of the user in the captured image are expressed by a coordinate system (hereinafter called a "camera coordinate system") in the captured image. As a method for detecting the positions of the hand-joint points, a known hand-tracking technology is available. In the known hand-tracking technology, the hand-joint points are detected by, for example, machine learning. Further, as the known hand-tracking technology, a technology in which distances from the imaging unit 122 to the hand-joint points are calculated by parallax estimation based on stereo matching and triangulation is available.

Figure 3:
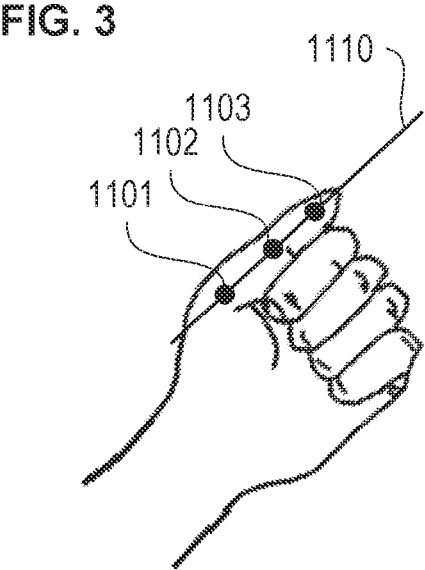
FIG. 3 is a diagram for describing the acquisition of an imaging attitude-angle according to the first embodiment.

The hand-attitude acquisition unit 126 converts, on the basis of the position and attitude of the imaging unit 122, the positions of hand-joint points in the camera coordinate system detected by the hand-joint detection unit 125 into positions in a world coordinate system expressing a reality space. Then, the hand-attitude acquisition unit 126 acquires the attitude angle (hereinafter called the "imaging attitude-angle") of the hand of a user estimated on the basis of the positions of the hand-joint points. In the first embodiment, the attitude angle of the hand of a user represents the attitude angle of a thumb. For example, the hand-attitude acquisition unit 126 acquires an imaging-attitude angle on the basis of a direction 1110 (inclination) of a line connecting three joint points 1101, 1102, and 1103 of a thumb to each other as shown in FIG. 3. That is, the hand-attitude acquisition unit 126 recognizes that a hand is oriented in the direction 1110 and acquires the attitude angle of the hand. Note that the attitude angle of the hand is not limited to the attitude angle of the thumb but may be the attitude angle of any finger such as an index finger.

The estimation unit 127 estimates (acquires) the attitude angle of the hand of the user on the basis of a controller attitude-angle and an imaging attitude-angle. The estimation unit 127 acquires, when the difference between a controller attitude-angle and an imaging attitude-angle is smaller than a threshold, an average of the two attitude angles as the attitude angle of the hand of the user. When the difference between the controller attitude-angle and the imaging attitude-angle is larger than the prescribed value, the estimation unit 127 selects one of the controller attitude-angle and the imaging attitude-angle having a smaller change amount with respect to the last value and acquires the selected one as the attitude angle of the hand of the user.

Estimation Processing

Figure 4:
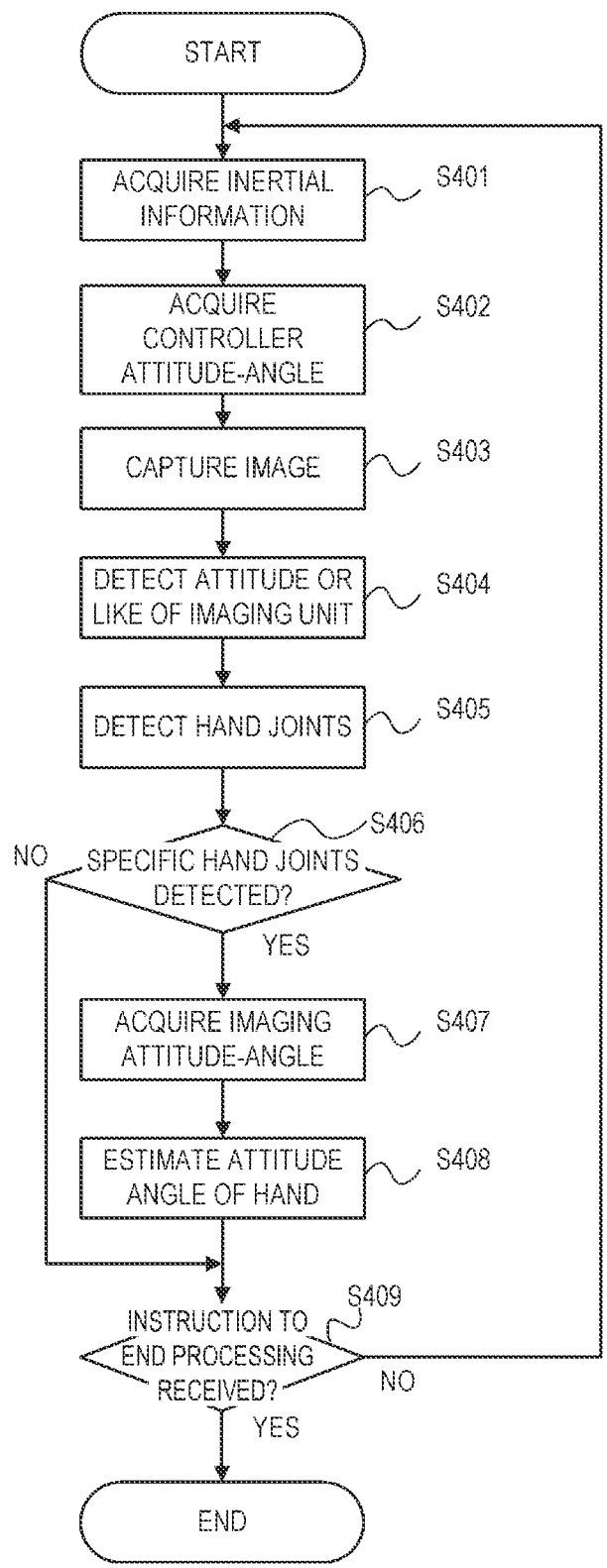
FIG. 4 is a flowchart of estimation processing according to the first embodiment.

With reference to the flowchart of FIG. 4, processing (estimation processing) for estimating the attitude (attitude angle) of the hand of a user in the first embodiment will be described. The respective processing of the flowchart of FIG. 4 is realized, for example, when the processor of the HMD 120 operates as respective configurations such as the communication unit 121 and the estimation unit 127. At this time, the processor runs a program stored in the storage medium of the HMD 120 to operate as the respective configurations.

In step S401, the communication unit 121 acquires inertial information from the inertial sensor 112 of the controller 110.

In step S402, the sensor-attitude acquisition unit 124 acquires a controller attitude-angle (the attitude angle of the controller 110) on the basis of the inertial information (acceleration and an angular speed acquired by the inertial sensor 112) acquired in step S401.

In step S403, the imaging unit 122 captures an image of a space in front of the imaging unit 122 by a stereo camera.

In step S404, the camera-attitude detection unit 123 detects the position and attitude of the imaging unit 122 on the basis of the image (captured image) captured from the space in front of the imaging unit 122 in step S403.

In step S405, the hand-joint detection unit 125 detects the hand-joint points of a user from the captured image.

In step S406, the hand-joint detection unit 125 determines whether specific hand-joint points have been detected in the captured image on the basis of the detection result of the hand-joint points in step S405. Here, the specific hand-joint points represent hand-joint points required to acquire an imaging attitude-angle and are shown as the three joint points of a thumb (the joint points 1101, 1102, and 1103 of the thumb as shown in FIG. 3) in the first embodiment. When it is determined that the specific hand-joint points have been detected, the processing proceeds to step S407. When it is determined that the specific hand-joint points have not been detected, the processing proceeds to step S409. Note that a determination may be made as to whether specific portions (such as the claw and bone of a specific finger) usable to acquire the attitude angle of a hand instead of the specific hand-joint points have been detected.

In step S407, the hand-attitude acquisition unit 126 converts, on the basis of the position and attitude of the imaging unit 122, the positions of the specific hand-joint points in a camera coordinate system in the captured image into positions in a world coordinate system expressing a reality space. Then, the hand-attitude acquisition unit 126 acquires an imaging attitude-angle (the attitude angle of the hand of the user) on the basis of the positions of the specific hand-joint points in the world coordinate system. For example, the hand-attitude acquisition unit 126 acquires the imaging attitude-angle according to a direction shown by a line connecting the three joint-points of the thumb to each other.

In step S408, the estimation unit 127 estimates (acquires) the attitude angle (attitude) of the hand of the user on the basis of the controller attitude-angle and the imaging attitude-angle. For example, the estimation unit 127 acquires an average of the controller attitude-angle and the imaging attitude-angle as the attitude angle (attitude) of the hand of the user.

In step S409, the estimation unit 127 determines whether an instruction to end the processing has been received from the user. When it is determined that the instruction has not been received, the processing proceeds to step S401. When it is determined that the instruction has been received, the processing of the flowchart ends.

Note that the estimation unit 127 may acquire the controller attitude-angle as the attitude angle of the hand when it is determined in step S406 that the specific hand-joint points have not been detected (NO in step S406).

As described above, the controller system estimates the attitude of the hand of a user using both an attitude angle (controller attitude-angle) based on inertial information on the inertial sensor of a controller and the attitude angle (imaging attitude-angle) of the hand based on photographing by the imaging unit of an HMD in the first embodiment. Therefore, the accurate estimation (detection) of the attitude of the hand of a user is enabled. Further, since the controller does not require the provision of a sensor or the like other than the inertial sensor, the miniaturization of the controller is made possible.

Second Embodiment

A second embodiment will describe a controller system (information processing system) that changes a method for estimating the attitude angle of a hand according to the reliability of an imaging attitude-angle (the detection of hand joints in a captured image).

Figure 5:
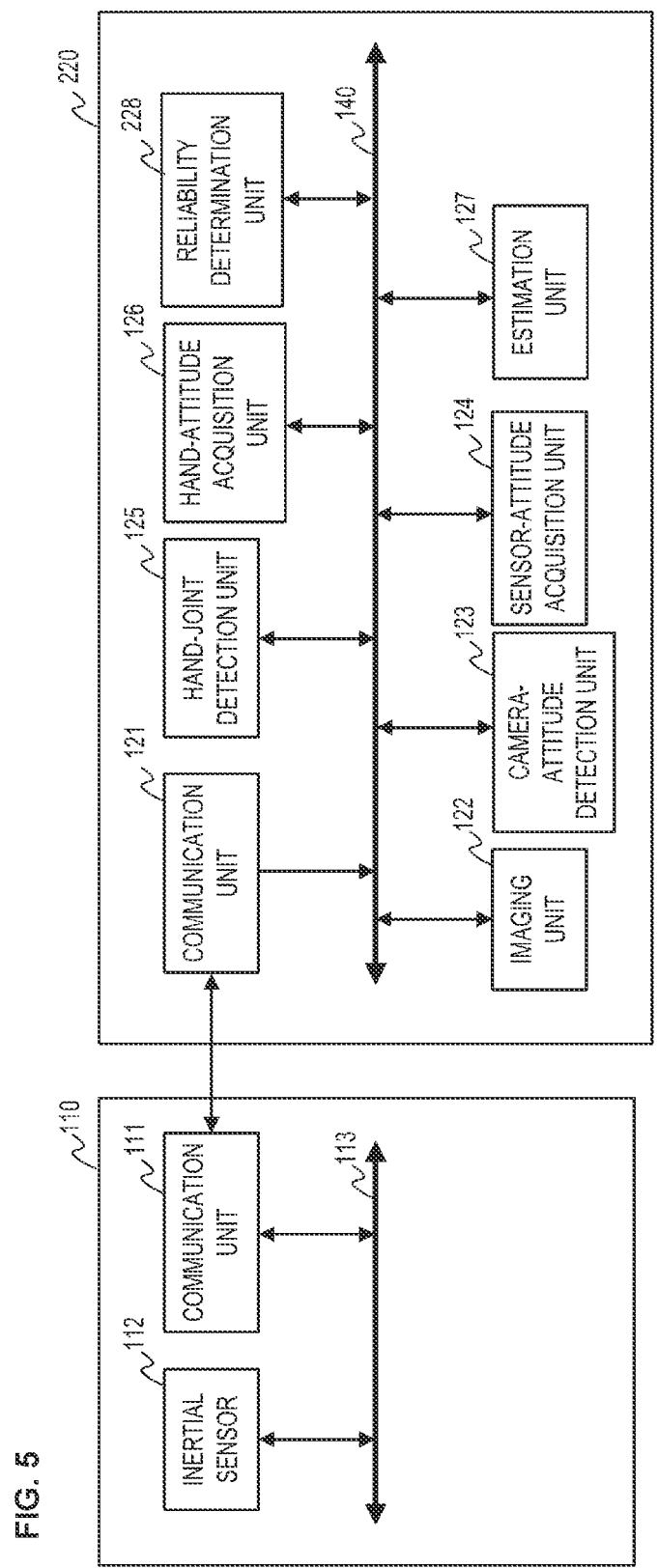
FIG. 5 is a configuration diagram of a controller system according to a second embodiment.

FIG. 5 is a configuration diagram of the controller system according to the second embodiment. Note that the descriptions of the same configurations as those of the first embodiment will be omitted in FIG. 5. An HMD 220 has a reliability determination unit 228 in addition to the configurations of the HMD 120 according to the first embodiment.

Figure 6A:
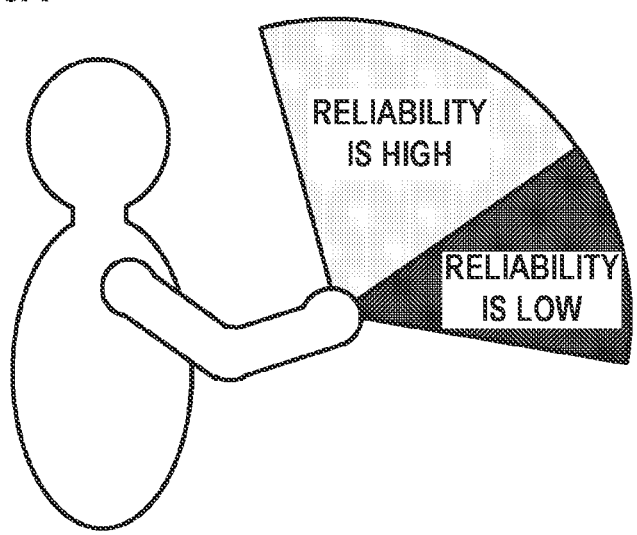
FIGS. 6A to 6D are diagrams for describing the reliability of an imaging attitude-angle according to the second embodiment.

The reliability determination unit 228 determines the reliability of an imaging attitude-angle (that is, the reliability of the detection of specific hand joints by a hand-joint detection unit 125) on the basis of the imaging attitude-angle acquired by the hand-attitude acquisition unit 126. Here, the larger the angle between the direction of the hand of a user and a ground surface (horizontal surface), the higher the visibility of the hand joints from an imaging unit 122 is. Further, the clearer the positions of the specific hand joints to detect the hand joints from a captured image, the higher the reliability of the imaging attitude-angle is. Therefore, the reliability determination unit 228 determines that the reliability of an imaging attitude-angle is higher if the angle (inferior angle) between the direction of the hand of a user and a ground surface (horizontal surface) is larger as shown in FIG. 6A. For example, the reliability of an imaging attitude-angle may be the angle itself between the direction of the hand of a user and a ground surface (horizontal surface) shown by the imaging attitude-angle. Further, since the estimation of the attitude angle of a thumb is, for example, made possible from the states of other fingers, the reliability of an imaging attitude-angle may be a higher value if the number of hand joints reflected in a captured image is larger.

Figure 6B:
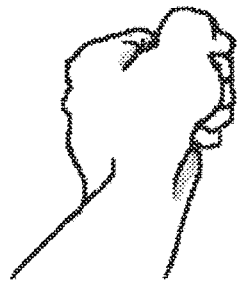
Figure 6C:
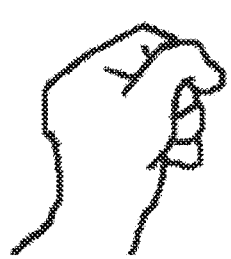
Figure 6D:
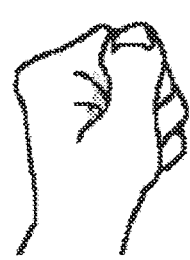

The reliability determination unit 228 may determine the reliability of an imaging attitude-angle according to the range of a specific finger reflected in a captured image. In this case, in the example of the captured image of FIG. 6B, the reliability of an imaging attitude-angle is low since a part of a thumb is hidden. In the example of the captured image of FIG. 6C, the reliability is high since the thumb appears. In the example of the captured image of FIG. 6D, the reliability is the highest since a wider range of the thumb appears.

Figure 7:
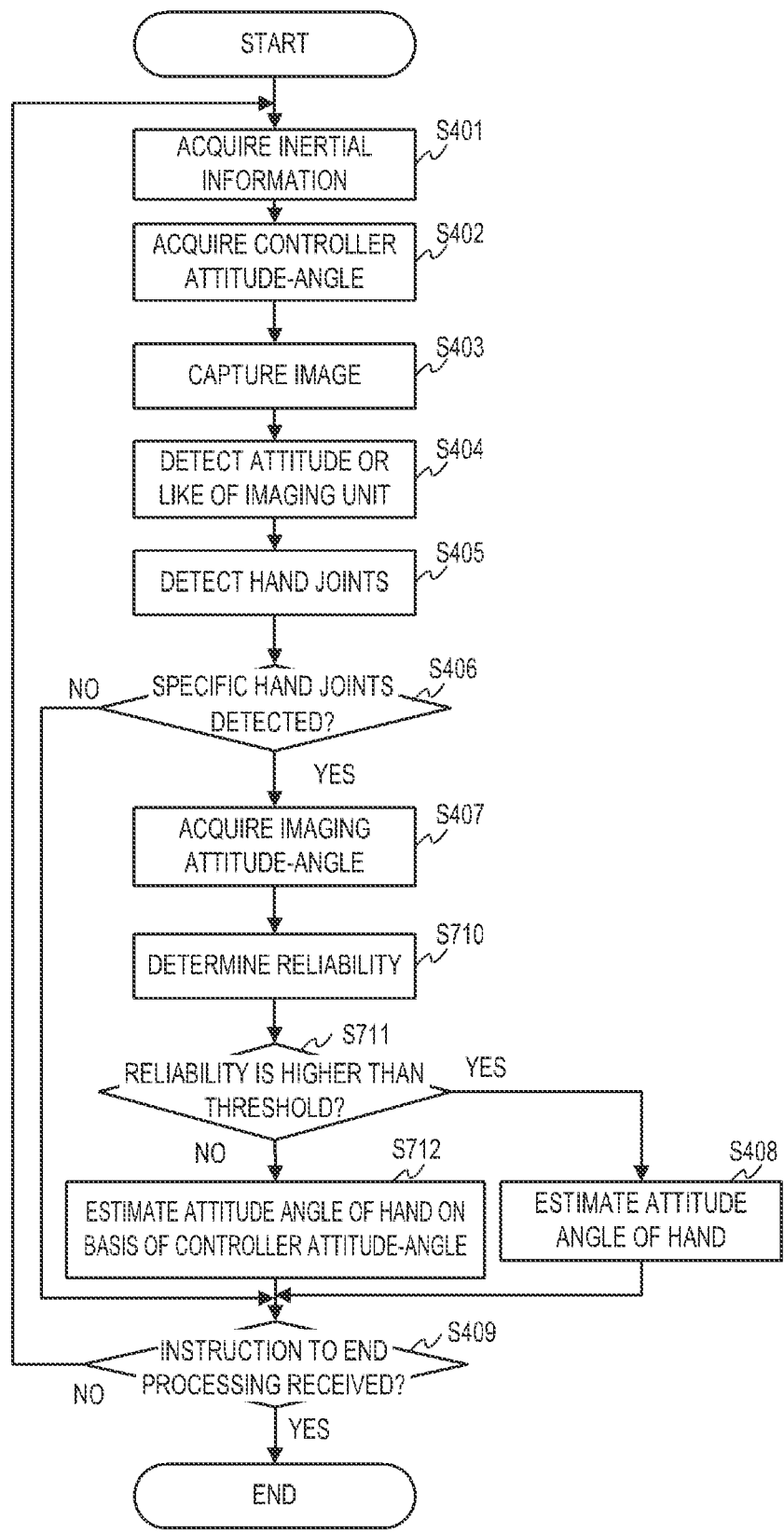
FIG. 7 is a flowchart of estimation processing according to the second embodiment.

With reference to the flowchart of FIG. 7, estimation processing for estimating the hand attitude of a user in the second embodiment will be described. Note that the descriptions of the same steps as those of the first embodiment will be omitted in the flowchart.

In step S710, the reliability determination unit 228 determines the reliability of an imaging attitude-angle (the reliability of the detection of specific hand joints) on the basis of the value of the imaging attitude-angle.

In step S711, the reliability determination unit 228 determines whether the reliability of the imaging attitude-angle is higher than a specific threshold (that is, the angle between the direction of the hand of the user shown by the imaging attitude-angle and a ground surface is larger than a prescribed angle). When it is determined that the reliability of the imaging attitude-angle is higher than the specific threshold, the processing proceeds to step S408. When it is determined that the reliability of the imaging attitude-angle is not more than the specific threshold (that is, the angle between the direction of the hand of the user shown by the imaging attitude-angle and the ground surface is not more than the prescribed angle), the processing proceeds to step S712.

In step S712, the estimation unit 127 estimates the attitude angle of the hand on the basis of a controller attitude-angle acquired by a sensor-attitude acquisition unit 124 without relying on the imaging attitude-angle since the reliability of the imaging attitude-angle is low. That is, the estimation unit 127 acquires the controller attitude-angle as the attitude angle of the hand.

As described above, the controller system determines the reliability of an imaging attitude-angle based on photographing by the imaging unit of an HMD, and does not use the imaging attitude-angle for the estimation of the attitude of a hand when the reliability is low in the second embodiment. Thus, since the possibility of using low-accuracy information is reduced, the more accurate estimation (detection) of the attitude of the hand of a user is enabled.

Third Embodiment

A third embodiment will describe a controller system (information processing system) that further estimates the position of a hand on the basis of the detection of hand joints from a captured image.

Figure 8:
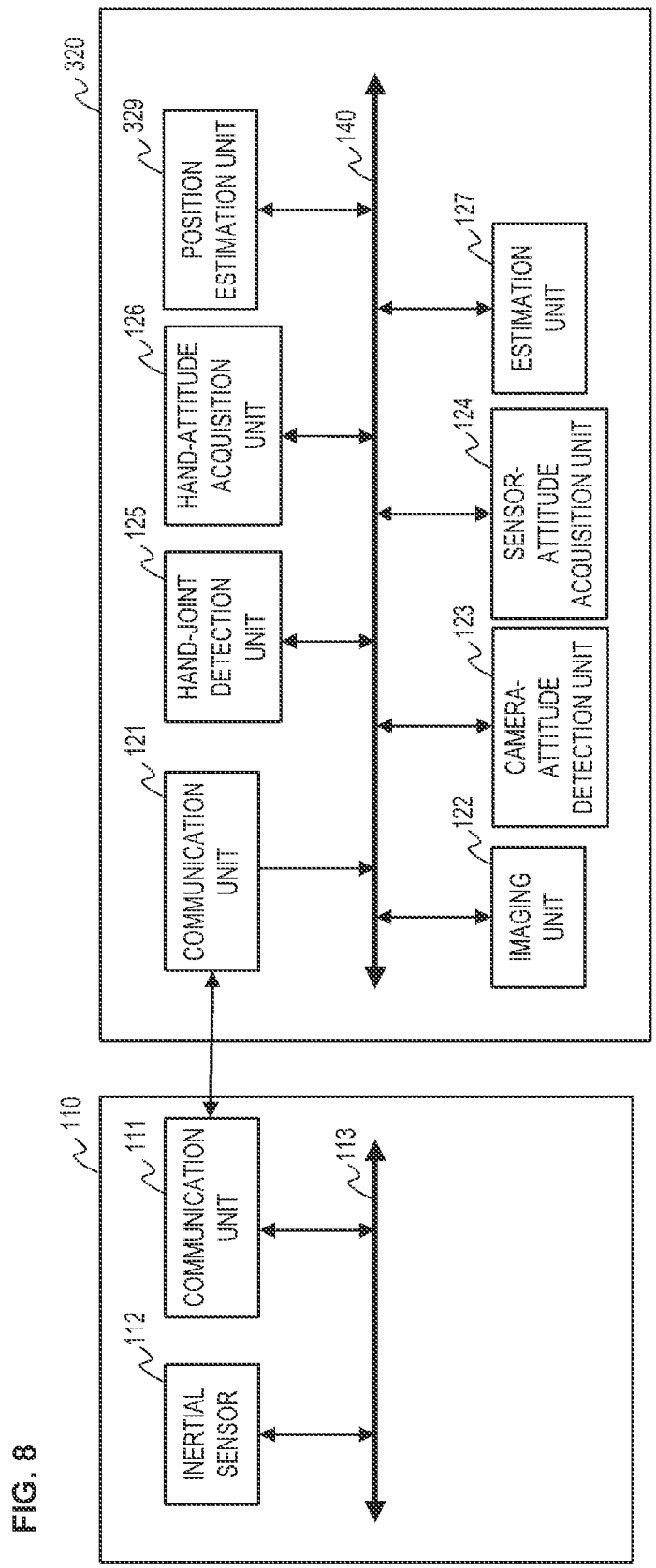
FIG. 8 is a configuration diagram of a controller system according to a third embodiment.

FIG. 8 is a configuration diagram showing a configuration example of the controller system according to the third embodiment. Note that the descriptions of the same configurations as those of the first embodiment will be omitted in FIG. 8. An HMD 320 according to the third embodiment has a position estimation unit 329 in addition to the configurations of the HMD 120 according to the first embodiment.

The position estimation unit 329 converts the positions of hand-joint points in a camera coordinate system detected by a hand-joint detection unit 125 into positions in a world coordinate system expressing a reality space to estimate the position of a hand. Note that the position of the hand is assumed to be the position of the tip end 1103 of the thumb shown in FIG. 3 in the third embodiment. Note that the position of the hand estimated by the position estimation unit 329 may be the position of a joint point of another finger. Further, the position of the hand may be the center of gravity of all hand-joint points detected by a hand-joint detection unit 125 or the center of gravity of some of detected hand-joint points.

Figure 9:
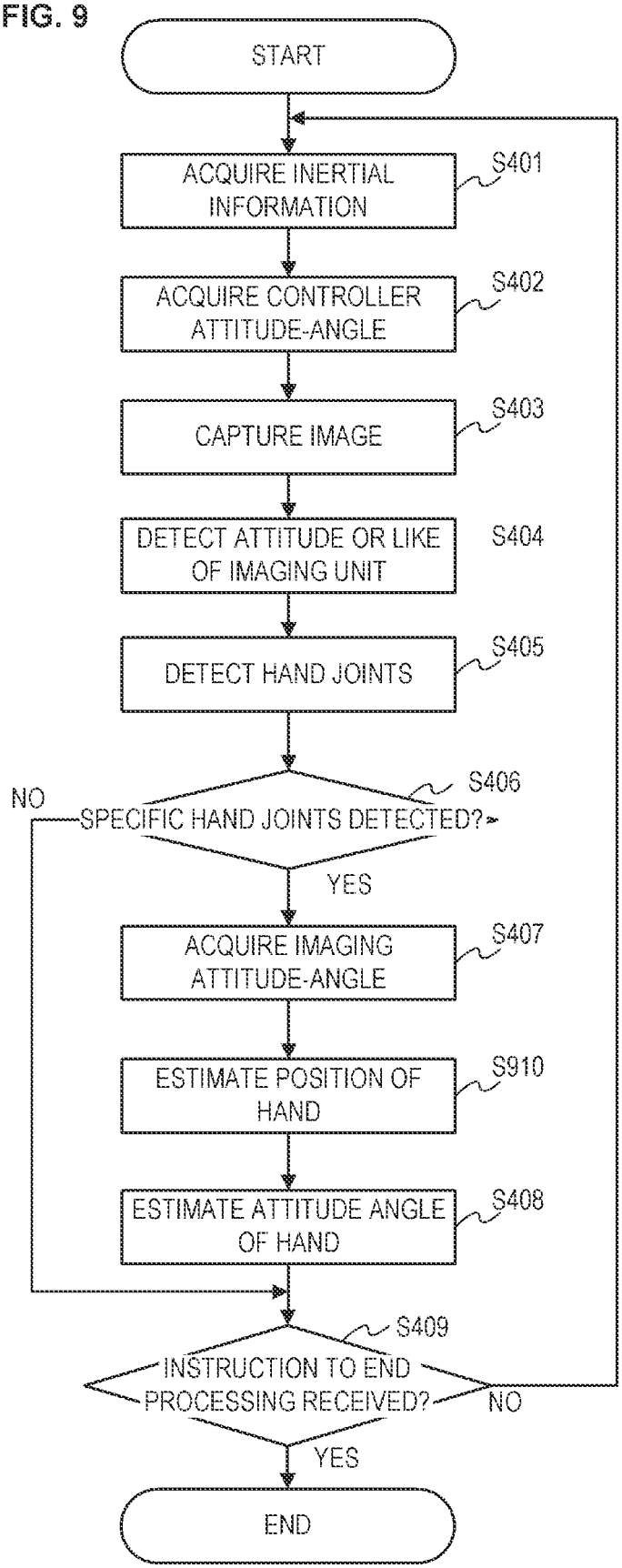
FIG. 9 is a flowchart of estimation processing according to the third embodiment.

With reference to the flowchart of FIG. 9, estimation processing for estimating the attitude (attitude angle) of the hand of a user in the third embodiment will be described. Note that the descriptions of the same steps as those of the first embodiment will be omitted in the flowchart of FIG. 9.

In step S910, the position estimation unit 329 estimates the position of a hand on the basis of the positions of the hand-joint points of the user detected in step S405.

Figure 10:
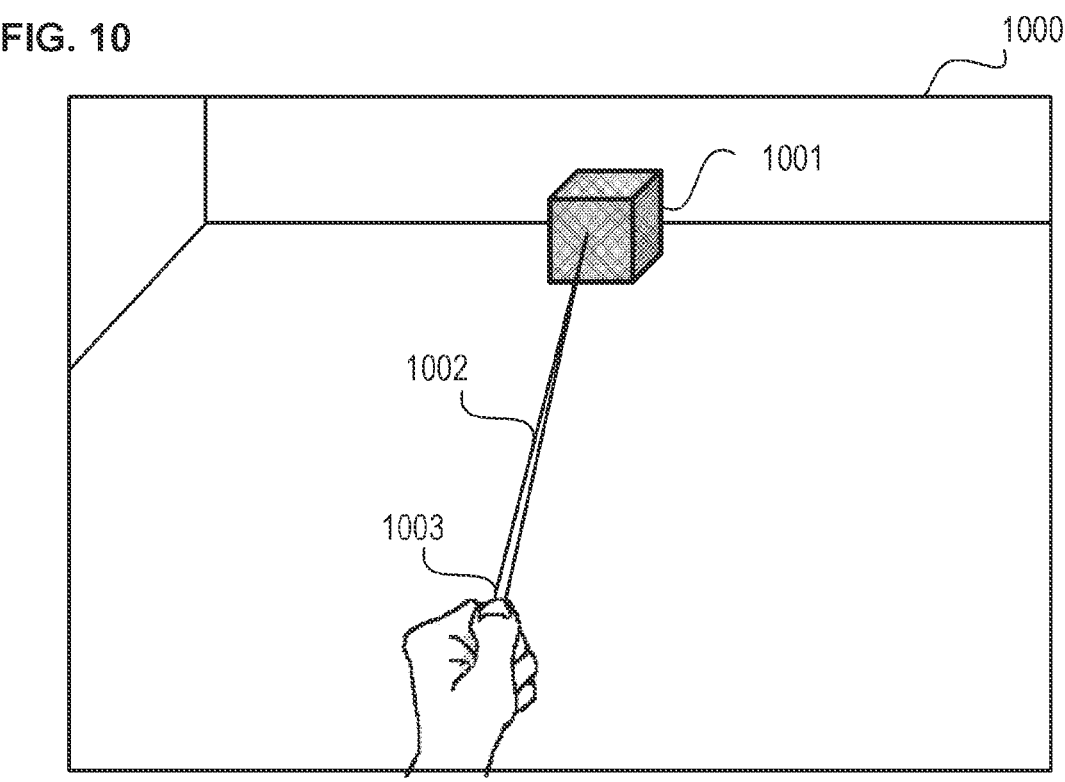
FIG. 10 is a diagram for describing the drawing of a CG according to the third embodiment.

Next, an example of drawing a CG using the position and attitude of a hand in the third embodiment will be described using FIG. 10. A combined image 1000 is an image expressing a virtual space displayed on the display of an HMD 110. In the combined image 1000, a ray 1002 (CG light) is drawn as a UI (a user interface; a display item) for selecting a CG object 1001 located at a distant position. Note that the extending direction of the ray 1002 is determined by the control unit of the HMD 100 on the basis of the attitude angle of a hand estimated by an estimation unit 127. Further, the start point of the ray 1002 is determined by the control unit on the basis of the position of the hand estimated by the position estimation unit 329. Note that a pointer displayed at a position based on the attitude and position of the hand may be used instead of a ray.

Note that the estimated position and attitude of the hand may be used for any purpose other than controlling the display of a ray. For example, the control unit of the HMD 320 may determine an object indicated by the hand of a user and bring the focus of an imaging unit 122 to the object on the basis of the estimated position and attitude of the hand. Alternatively, the control unit of the HMD 320 may determine an object indicated by the hand of the user and display a distance from the HMD 320 to the object on a display on the basis of the estimated position and attitude of the hand.

As described above, the attitude of a hand is estimated on the basis of a controller attitude-angle and an imaging attitude-angle, and the position of the hand is also estimated in the third embodiment. Thus, the accurate detection of the position and attitude of the hand of a user is enabled.

Fourth Embodiment

A fourth embodiment will describe a controller system (information processing system) further having a calibration unit that calibrates an inertial sensor. The output characteristics of the inertial sensor change depending on temperature, air pressure, external vibration, shock, or the like. Therefore, there is a case where a bias value (inertial information) output from the inertial sensor changes depending on environmental information (external environment). In view of this, the fourth embodiment makes it possible to maintain the accuracy of the inertial sensor with the calibration unit.

Figure 11:
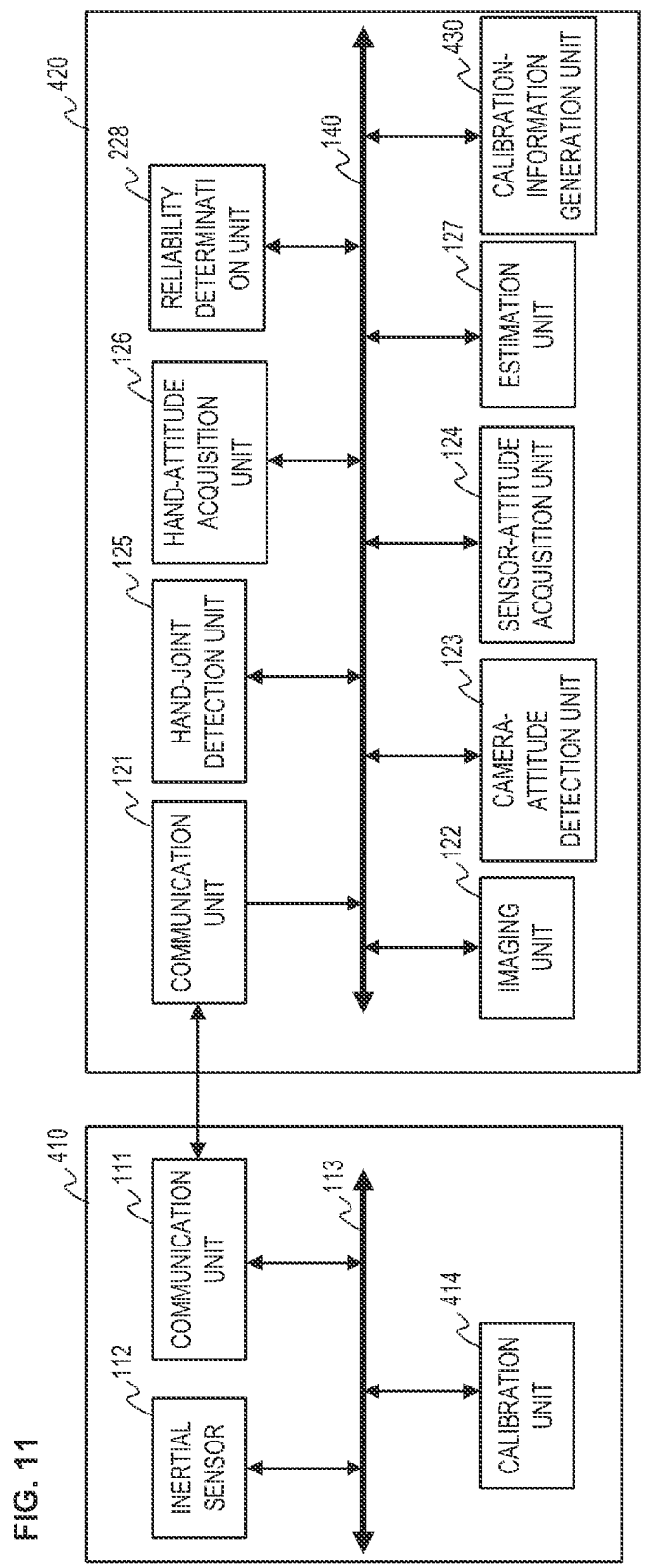
FIG. 11 is a configuration diagram of a controller system according to a fourth embodiment.

FIG. 11 is a configuration diagram of the controller system according to the fourth embodiment. Note that the descriptions of the same configurations as those of the first and second embodiments will be omitted in FIG. 11. A controller 410 according to the fourth embodiment has a calibration unit 414 in addition to the configurations of the controller 110 according to the first embodiment. An HMD 420 according to the fourth embodiment has a calibration-information generation unit 430 in addition to the configurations of the HMD 220 according to the second embodiment.

The calibration unit 414 acquires calibration information generated by the calibration-information generation unit 430 via a communication unit 121 and a communication unit 111. The calibration unit 414 calibrates an inertial sensor 112 on the basis of the calibration information. The inertial sensor 112 after the calibration outputs inertial information obtained by correcting inertial information acquired by the inertial sensor 112 before the calibration according to the calibration information.

The calibration-information generation unit 430 stores the relative relationship (attitude-angle relative data) between a controller attitude-angle and an imaging attitude-angle in the stationary state of the controller 410 (at the stationary time of the controller 410). In the present embodiment, the attitude-angle relative data is described as a value obtained by subtracting the imaging attitude-angle from a controller attitude-angle (the difference value between the two attitude angles) at the stationary time of the controller 410. However, any information may be used so long as the relative relationship between the two attitude angles is shown by the information.

Further, the calibration-information generation unit 430 estimates a controller attitude-angle on the basis of attitude-angle relative data from an imaging attitude-angle acquired during the operation of the HMD 420 and the controller 410. Here, the estimated controller attitude-angle is called an "estimated attitude angle." For example, the calibration-information generation unit 430 estimates an estimated attitude-angle by adding an imaging attitude-angle and attitude-angle relative data acquired during the operation of the HMD 420 together. Then, the calibration-information generation unit 430 acquires the difference between the estimated attitude-angle and a controller attitude-angle (a controller attitude-angle at the present moment) acquired by the sensor-attitude acquisition unit 124 as calibration information for the inertial sensor 112. Note that the calibration information may be any information so long as the information is one that is used to calibrate the inertial sensor 112 and corresponds to the difference between an estimated attitude-angle and a controller attitude-angle at the present moment.

With reference to the flowchart of FIG. 12, estimation processing for estimating the attitude (attitude angle) of the hand of a user in the fourth embodiment will be described. Note that the descriptions of the same steps as those of the first and second embodiments will be omitted in the flowchart of FIG. 12.

In step S1215, the calibration-information generation unit 430 generates (acquires) the relative relationship (attitude-angle relative data) between a controller attitude-angle and an imaging attitude-angle in a state in which a controller 410, the HMD 420, and a hand are all in the stationary state.

Figure 13:
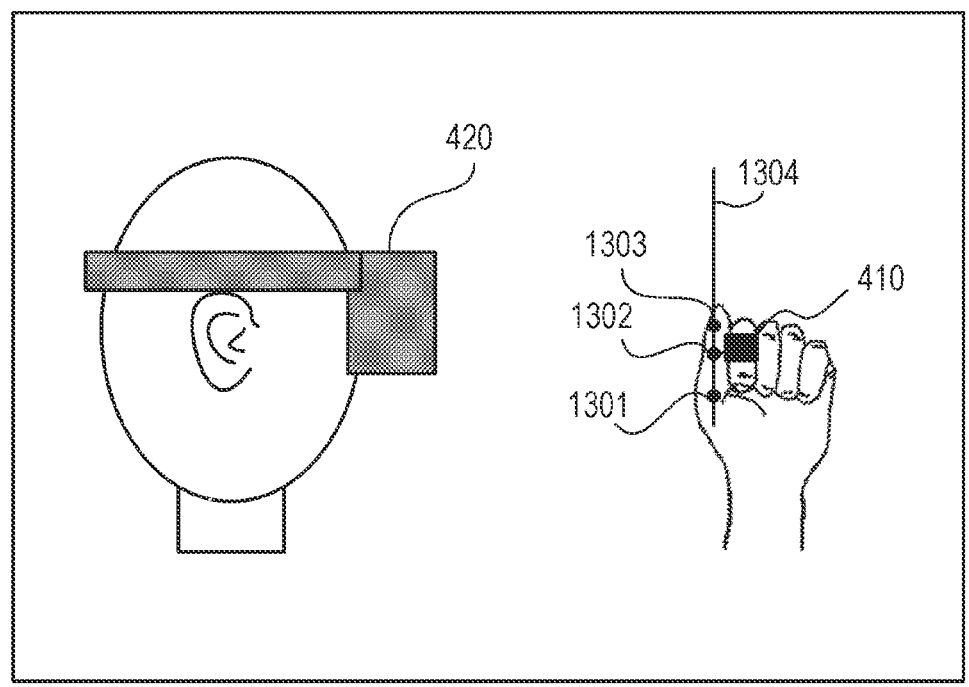
FIG. 13 is a diagram for describing the generation of attitude-angle relative data according to the fourth embodiment.

With reference to FIG. 13, specific processing for generating attitude-angle relative data will be described. First, a user stops his/her hand in front of the HMD 420 and photographs the hand by an imaging unit 122 mounted in the HMD 420. Then, a hand-attitude acquisition unit 126 acquires an imaging attitude-angle on the basis of a direction 1304 of a line connecting joint points 1301, 1302, and 1303 of a thumb to each other in a captured image. Further, the sensor-attitude acquisition unit 124 acquires a controller attitude-angle on the basis of inertial information output from the inertial sensor 112 of the controller 410 at that time. Then, the calibration-information generation unit 430 generates attitude-angle relative data showing the relationship between the imaging attitude-angle and the controller attitude-angle.

In step S1216, the calibration-information generation unit 430 determines whether a prescribed time has elapsed since the time at which calibration information was generated last time. In order to periodically generate (update) calibration information, the processing proceeds to step S1217 when the prescribed time has elapsed since the time at which the calibration information was generated last time. The processing proceeds to step S409 when the prescribed time has not elapsed since the time.

In step S1217, the calibration-information generation unit 430 acquires an estimated attitude-angle (the estimated angle of the controller attitude-angle) on the basis of the attitude-angle relative data generated in step S1215 and the imaging attitude-angle acquired in step S407. The calibration-information generation unit 430 generates calibration information on the basis of the difference between the controller attitude-angle acquired in step S402 and the estimated attitude-angle. Then, the calibration-information generation unit 430 transmits the newly-generated calibration information to the calibration unit 414 via the communication unit 121 and the communication unit 111. The calibration unit 414 having acquired the calibration information calibrates the inertial sensor 112 on the basis of the calibration information.

Note that the processing of step S1217 is performed only when it is determined in step S711 that the reliability of the imaging attitude-angle (the detection of specific hand-joints) is higher than a threshold. Therefore, the generation of calibration information is enabled using a highly-reliable imaging attitude-angle.

As described above, the periodical calibration of the inertial sensor of a controller is enabled on the basis of a highly-reliable imaging attitude-angle in the fourth embodiment. Therefore, the output accuracy of the inertial sensor is improved. Thus, the further accurate detection of the attitude of the hand of the user is enabled.

Modified Example 1

As a modified example of the fourth embodiment, the calibration-information generation unit 430 may further have a table generation unit that generates a calibration table to store attitude-angle relative data for each state of a hand joint. In this case, the controller system is capable of selecting (switching) attitude-angle relative data according to the attitude of a hand to calibrate the inertial sensor 112. Here, the calibration table is stored in, for example, the storage unit of the table generation unit.

Figure 12:
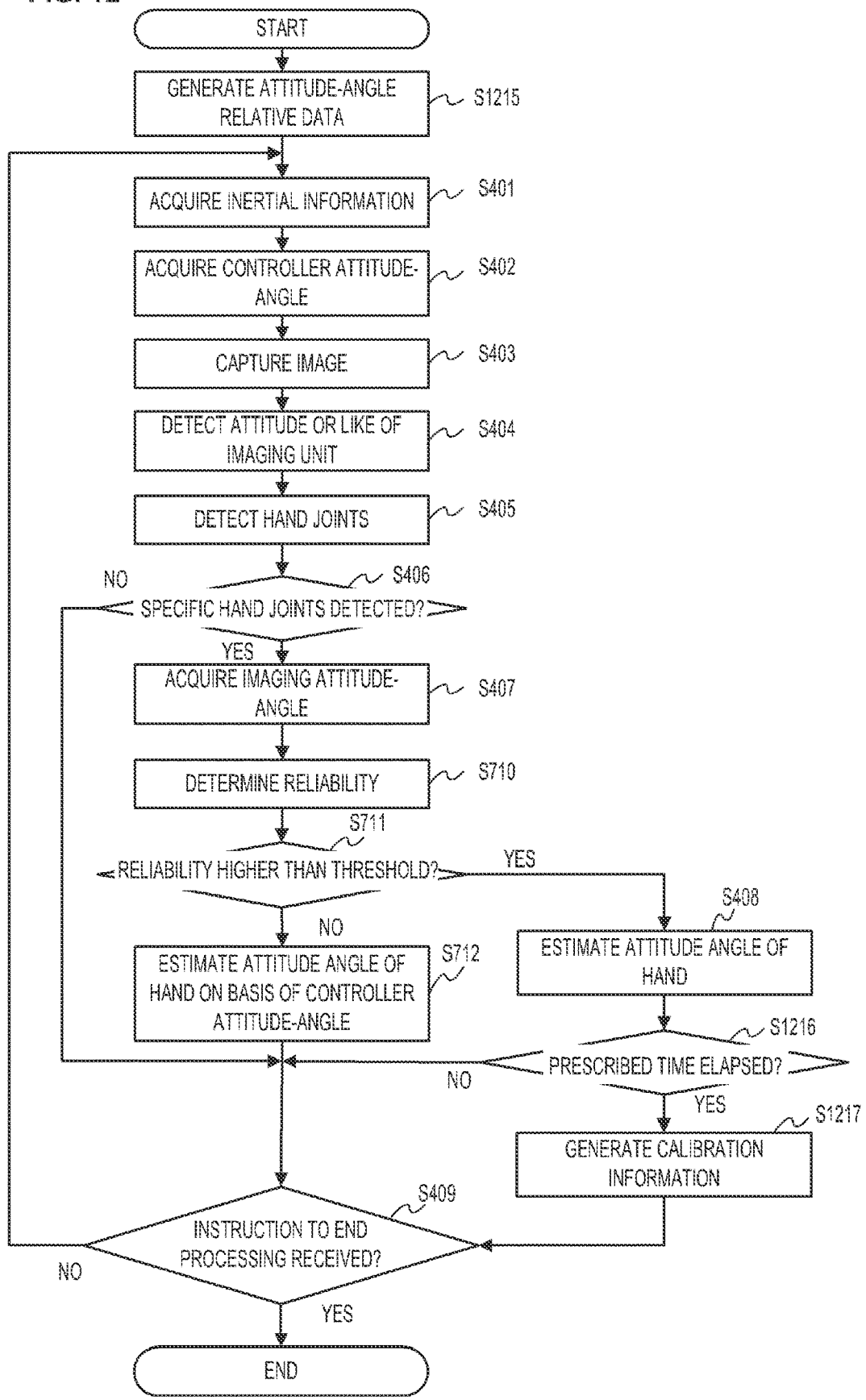
FIG. 12 is a flowchart of estimation processing according to the fourth embodiment.
Figure 14A:
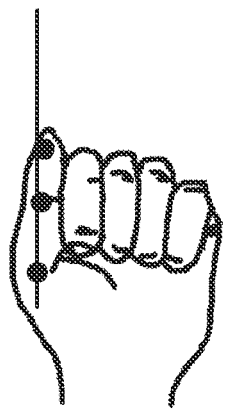
FIGS. 14A to 14C are diagrams for describing a plurality of imaging attitude-angles according to the fourth embodiment.
Figure 14B:
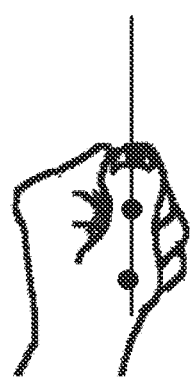
Figure 14C:
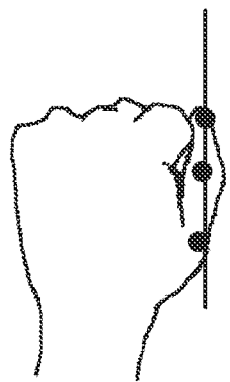

For example, in step S1215 of FIG. 12, the calibration-information generation unit 430 generates attitude-angle relative data for each of a plurality of attitude angles (imaging attitude-angles) (for example, for each of a plurality of attitude angles corresponding to a hand shown in FIGS. 14A to 14C) at the stationary time of the controller 410. Then, the calibration-information generation unit 430 stores the plurality of attitude-angle relative data in the calibration table.

In step S1217, the calibration-information generation unit 430 acquires attitude-angle relative data corresponding to an attitude angle closest to an imaging attitude-angle (imaging attitude-angle at the present moment) acquired by the hand-attitude acquisition unit 126 from the calibration table (storage unit). Then, the calibration-information generation unit 430 calculates an estimated attitude-angle on the basis of the acquired attitude-angle relative data and the imaging attitude-angle. The calibration-information generation unit 430 generates calibration information on the basis of the difference between the estimated attitude-angle and a controller attitude-angle. After that, the calibration-information generation unit 430 transmits the calibration information to the calibration unit 414. The calibration unit 414 calibrates the inertial sensor 112 on the basis of the calibration information.

As described above, the controller system has a plurality of attitude-angle relative data corresponding to a plurality of attitude angles of a hand in the modified example 1. Then, the controller system selects appropriate attitude-angle relative data according to the acquired attitude-angle of a hand to calibrate the inertial sensor. Thus, the output accuracy of the inertial sensor is further stabilized, and the further accurate detection of the attitude of the hand of a user is enabled.

According to the present invention, the accurate acquisition (estimation) of the attitude of the hand of a user is enabled on the basis of information on a controller even if the controller held by the hand of the user is small.

Further, in the above descriptions, "processing proceeds to step S1 when A is at least B, and proceeds to step S2 when A is smaller (lower) than B" may be read as "the processing proceeds to step S1 when A is larger (higher) than B, and proceeds to step S2 when A is not more than B." Conversely, "processing proceeds to step S1 when A is larger (higher) than B, and proceeds to step S2 when A is not more than B" may be read as "the processing proceeds to step S1 when A is at least B, and proceeds to S2 when A is smaller (lower) than B." Therefore, the expression "at least A" may be replaced with "equal to A or larger (higher, longer, or greater) than A," or may be read as or replaced with "larger (higher, longer, or greater) than A" so long as no contradiction arises. Meanwhile, the expression "not more than A" may be replaced with "equal to A or smaller (lower, shorter, or less) than A," or may be replaced with or read as "smaller (lower, shorter, or less) than A." Further, "larger (higher, longer, greater) than A" may be read as "at least A," and "smaller (lower, shorter, or less) than A" may be read as "not more than A."

The present invention is described in detail above on the basis of the preferred embodiments but is not limited to the specific embodiments. The present invention also includes various other modes without departing from its gist. Some of the embodiments described above may be appropriately combined together.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-080180, filed on May 16, 2022, which is hereby incorporated by reference herein in its entirety.

What is claimed is:

1. An information processing device that estimates an attitude of a hand of a user holding a controller with the hand, the information processing device comprising:
   a processor; and
   a memory storing a program which, when executed by the processor, causes the information processing device to:
      execute acquisition processing to acquire inertial information from an inertial sensor provided in the controller;
      execute determination processing to determine whether a specific portion of the hand of the user is detected in a captured image acquired by imaging of an imaging unit; and
      execute estimation processing to estimate the attitude of the hand of the user on a basis of the inertial information in a case where the inertial information is acquired in the acquisition processing,
   wherein in the estimation processing, the attitude of the hand of the user is estimated on a basis of the captured image and the inertial information in a case where it is determined by the determination processing that the specific portion is detected in the captured image, and the attitude of the hand of the user is estimated on a basis of the inertial information in a case where it is not determined by the determination processing that the specific portion is detected in the captured image, and
   wherein in the estimation processing, in a case where it is determined by the determination processing that the specific portion is detected in the captured image and a difference between the attitude of the hand of the user based on the captured image and the attitude of the hand of the user based on the inertial information is greater than a predetermined value, the attitude of the hand of the user with a smaller amount of change from a previous value, between the attitude of the hand of the user based on the captured image and the attitude of the hand of the user based on the inertial information, is determined as an estimation result of the attitude of the hand of the user.

2. The information processing device according to claim 1, wherein
   the controller is a ring-shaped controller attachable to a finger of a user.

3. The information processing device according to claim 1, wherein
   the information processing device is a head-mounted display, and
   the head-mounted display has the imaging unit and a display.

4. An information processing system comprising:
   the information processing device according to claim 1; and
   the controller having the inertial sensor that acquires the inertial information.

5. The information processing device according to claim 1, wherein in the estimation processing, in a case where it is determined by the determination processing that the specific portion is detected in the captured image, the attitude of the hand of the user is estimated on the basis of the captured image and the attitude of the hand of the user is estimated on the basis of the inertial information, respectively.

6. The information processing device according to claim 1, wherein
in the estimation processing, in a case where it is determined by the determination processing that the specific portion is detected in the captured image and a difference between the attitude of the hand of the user based on the captured image and the attitude of the hand of the user based on the inertial information is less than a predetermined value, an average of the attitude of the hand of the user based on the captured image and the attitude of the hand of the user based on the inertial information is determined as an estimation result of the attitude of the hand of the user.

7. An information processing method for estimating an attitude of a hand of a user holding a controller with the hand, the method comprising:
acquiring inertial information from an inertial sensor provided in the controller;
determining whether a specific portion of the hand of the user is detected in a captured image acquired by imaging of an imaging unit; and
estimating the attitude of the hand of the user on a basis of the inertial information in a case where the inertial information is acquired in the acquiring,
wherein in the estimating, the attitude of the hand of the user is estimated on a basis of the captured image and the inertial information in a case where it is determined by the determining that the specific portion is detected in the captured image, and the attitude of the hand of the user is estimated on a basis of the inertial information in a case where it is not determined by the determining that the specific portion is detected in the captured image, and
wherein in the estimating, in a case where it is determined by the determining that the specific portion is detected in the captured image and a difference between the attitude of the hand of the user based on the captured image and the attitude of the hand of the user based on the inertial information is greater than a predetermined value, the attitude of the hand of the user with a smaller amount of change from a previous value, between the attitude of the hand of the user based on the captured image and the attitude of the hand of the user based on the inertial information, is determined as an estimation result of the attitude of the hand of the user.

8. A non-transitory computer readable storage medium that stores a program, wherein the program causes a computer to execute an information processing method for estimating an attitude of a hand of a user holding a controller with the hand, the method comprising:
acquiring inertial information from an inertial sensor provided in the controller;
determining whether a specific portion of the hand of the user is detected in a captured image acquired by imaging of an imaging unit; and
estimating the attitude of the hand of the user on a basis of the inertial information in a case where the inertial information is acquired in the acquiring,
wherein in the estimating, the attitude of the hand of the user is estimated on a basis of the captured image and the inertial information in a case where it is determined by the determining that the specific portion is detected in the captured image, and the attitude of the hand of the user is estimated on a basis of the inertial information in a case where it is not determined by the determining that the specific portion is detected in the captured image, and
wherein in the estimating, in a case where it is determined by the determining that the specific portion is detected in the captured image and a difference between the attitude of the hand of the user based on the captured image and the attitude of the hand of the user based on the inertial information is greater than a predetermined value, the attitude of the hand of the user with a smaller amount of change from a previous value, between the attitude of the hand of the user based on the captured image and the attitude of the hand of the user based on the inertial information, is determined as an estimation result of the attitude of the hand of the user.

* * * * *